United States Patent Office 3,293,282
Patented Dec. 20, 1966

3,293,282
PROCESS FOR TREATMENT OF PLASTICIZERS
Martin W. Farrar, Kirkwood, Mo., and Katharine G. Johnston, Granite City, Ill., assignors to Monsanto Company, a corporation of Delaware
No Drawing. Filed Apr. 2, 1963, Ser. No. 269,859
11 Claims. (Cl. 260—475)

This invention relates to a process for the treatment of synthetic plasticizers. More particularly this invention relates to the treatment of certain dicarboxylic acid esters to improve their electrical properties.

Alkyl esters of dicarboxylic acids such as isophthalic, orthophthalic and terephthalic acids and mixtures thereof, and adipic, azelaic and sebacic acids are widely employed as plasticizers for synthetic resins such as polyvinyl chloride. Although these plasticizers are more than satisfactory in many applications, such plasticizers have been found to lack the necessary electrical characteristics to be used when high electrical resistance is desired in synthetic resin formulations.

As disclosed in the prior art, attempts to treat the aforedescribed dicarboxylic acid esters with various treating agents have met with little success.

In view of this state of the art, it has become desirable to discover a process for improving the electrical characteristics of the aforedescribed widely used plasticizers thereby increasing the versatility of the application of such plasticizers.

It is therefore an object of this invention to provide a novel method for the treatment of esters of a dicarboxylic acid selected from the group consisting of isophthalic, orthophthalic and terephthalic acids and mixtures thereof, and adipic, azelaic and sebacic acids to improve the electrical properties thereof.

It is a further object to provide a method for improving the electrical characteristics of such aforementioned dicarboxylic acid esters which is quick and effective, but yet is sufficiently inexpensive so as to allow its use on a commercial basis. These and other objects will readily be seen from the following description and claims.

According to this invention the electrical characteristics of dicarboxylic acid esters, particularly esters of isophthalic, orthophthalic and terephthalic acids and mixtures thereof, and adipic, azelaic and sebacic acids can be greatly improved by contacting said esters with small amounts of a silicate of an alkali earth metal selected from the group consisting of barium silicate and calcium silicate.

The method of the invention can be conveniently carried out by heating a mixture of the particular dicarboxylic acid ester to be treated and the alkali earth metal silicate, preferably with agitation, at temperatures in the range of from about 0° C. to 160° C. preferably 40–110° C. for a sufficient length of time. The longer the time of contact, the more efficient the treatment. However, a time of contact of about 1 hour produces an increase in electrical resistivity close to the maximum possible.

The process of the invention is applicable to any dialkyl ester of dicarboxylic acids selected from the group consisting of adipic, azelaic, sebacic, isophthalic, orthophthalic, terephthalic and mixtures of isomeric phthalic acids. Illustrative of such compounds are adipates such as diethyl adipate, dibutyl adipate, diisobutyl adipate, di-(1,3-dimethylbutyl) adipate, dicapryl adipate, dioctyl adipate, diisooctyl adipate, di(2-ethylhexyl) adipate, n-octyl-n-decyl adipate, dinonyl adipate, didecyl adipate, diisodecyl adipate and didodecyl adipate; azelates such as diisobutyl azelate, di(2-ethylbutyl) azelate, di(2-ethylhexyl) azelate and diisooctyl azelate; isophthalates such as dibutyl isophthalate, diisohexyl isophthalate, diisooctyl isophthalate, dineooctyl isophthalate, di(2-ethylhexyl) isophthalate, di-n-decyl isophthalate, diisodecyl isophthalate, dineododecyl isophthalate, ditridecyl isophthalate and isooctyl isodecyl isophthalate; orthophthalates such as dimethyl orthophthalate, diethyl orthophthalate, dipropyl orthophthalate, dibutyl orthophthalate, diisobutyl orthophthalate, diamyl orthophthalate, dihexyl orthophthalate, di-n-octyl orthophthalate, diisooctyl orthophthalate, dicapryl orthophthalate, di(2-ethylhexyl) orthophthalate, dinonyl orthophthalate, didecyl orthophthalate, diisodecyl orthophthalate, butyl isohexyl orthophthalate, butyl octyl orthophthalate, butyl decyl orthophthalate and decyl octyl orthophthalate; terephthalates such as dimethyl terephthalate, dibutyl terephthalate, dioctyl terephthalate, di-2-ethylhexyl terephthalate, di-n-decyl terephthalate and diisodecyl terephthalate; mixtures of the corresponding esters of the isophthalic, orthophthalic and terephthalic acids; and sebacates such as dimethyl sebacate, diethyl sebacate, dibutyl sebacate, dihexyl sebacate, dioctyl sebacate, diisooctyl sebacate, dicapryl sebacate, di(1,3-dimethylbutyl) sebacate and the like.

The amount of alkali earth metal silicate employed can be varied; however, for efficient treatment amounts varying from about 0.05% to about 1.5% by weight based on the weight of the ester will provide excellent results. A significant improvement in electrical characteristics can be effected, however, by the use of small amounts of at least 0.01%. Much larger amounts as high as 5.0% can be used but are generally not needed, and the use of such amounts is therefore wasteful.

The silicate materials which can be employed in this invention may be selected from naturally occurring and synthetic silicate materials.

The term "synthetic silicates" is meant to include the synthetic barium and calcium silicates. A preferred synthetic alkali earth metal silicate which has been found to give satisfactory results is calcium silicate (Micro-Cel "C" and Micro-Cel "E") prepared by hydrothermal reaction of diatomite and lime. Synthetic barium silicate (Bar-O-Sil) can also be used in the process of this invention.

The naturally occurring silicates such as Wollastonite are described in "The Colloid Chemistry of the Silicate Minerals," Academic Press, New York, 1949, by C. E. Marshall.

The following examples illustrate the advantageous and unexpected results which are achieved by use of the treating agents of this invention, but it is not intended that this invention be limited by or to the examples. Parts are parts by weight unless otherwise stated.

*Example 1*

Into a suitable reaction vessel having means for the addition and removal of liquids and solids, means for agitating the vessel contents, means for heating and cooling the vessel contents and means for measuring the temperature of liquids in the vessel, there was charged 250 grams of diisodecyl orthophthalate having an initial volume resistivity of $2.78 \times 10^{11}$ ohm cm. There was then added 1.25 grams of Micro-Cel "C," and the resulting mixture was agitated for about 1 hour during which time the temperature of the mixture was maintained at 100° C. The mixture was filtered, and the volume resistivity of the treated diisodecyl orthophthalate was found to be $32.2 \times 10^{11}$ ohm cm.

*Examples 2–14*

Following the procedure of Example 1 other dicarboxylic acid esters can be treated by alkaline earth metal silicates as summarized below:

TABLE I

| Example No. | Ester | Treating Agent | Percent Treating Agent | Volume-Resistivity (Ohm-cm.×$10^{11}$) Before Treatment | Volume-Resistivity (Ohm-cm.×$10^{11}$) After Treatment |
|---|---|---|---|---|---|
| 2 | Diisodecyl Orthophthalate. | Micro-Cel "C" | 0.5 | 2.37 | 20.7 |
| 3 | do | do | 0.5 | 2.53 | 23.6 |
| 4 | Di(2-ethylhexyl) Orthophthalate. | do | 0.5 | 0.96 | 11.0 |
| 5 | do | do | 0.5 | 2.01 | 15.8 |
| 6 | do | do | 0.5 | 1.32 | 12.2 |
| 7 | do | do | 0.5 | 1.74 | 15.8 |
| 8 | Diisodecyl Orthophthalate. | do | 0.5 | 5.5 | 71.9 |
| 9 | do | Micro-Cel "E" | 0.5 | 5.5 | 85.1 |
| 10 | do | Wollastonite | 0.5 | 5.5 | 33.5 |
| 11 | do | Micro-Cel "C" | 0.5 | 10.5 | 89.1 |
| 12 | do | Micro-Cel "E" | 0.5 | 10.5 | 75.9 |
| 13 | do | Wollastonite | 0.5 | 10.5 | 36.7 |
| 14 | Di(2-ethylhexyl) Adipate. | Micro-Cel "C" | 0.5 | 1.6 | 20.1 |

In a manner similar to the procedure of Example 1 striking improvement in the volume resistivities of azelaic, isophthalic, terephthalic and sebacic acid esters such as di(2-ethylhexyl) azelate, diisooctyl isophthalate, di(2-ethylhexyl) isophthalate, diisodecyl isophthalate, ditridecyl isophthalate, dioctyl terephthalate, di(2-ethylhexyl) terephthalate, dibutyl sebacate and dioctyl sebacate is obtained.

Similar results are obtained upon replacing the treating agents in the aforementioned examples with a synthetic barium silicate (Bar-O-Sil).

From the foregoing results it is evident that the volume resistivity of esters prepared from the afore-described dicarboxylic acids, and in particular orthophthalic acid, can be significantly improved by treatment with an alkali earth metal silicate.

While this invention has been described with respect to certain embodiments, it is not so limited, and it is to be understood that variations and modifications thereof which are obvious to those skilled in the art may be made without departing from the spirit or scope of this invention.

The embodiments of the invention in which an exclusive property or privilege is claimed are defined as follows:

1. A process which comprises contacting a dialkyl ester of a dicarboxylic acid selected from the group consisting of orthophthalic, adipic, azelaic and sebacic acids with an alkali earth metal silicate selected from the group consisting of barium and calcium silicates.

2. A process which comprises contacting a dialkyl ester of a dicarboxylic acid selected from the group consisting of orthophthalic, adipic, azelaic and sebacic acids with an alkali earth metal silicate selected from the group consisting of barium and calcium silicates in the amount of from about 0.01% to about 5.0% by weight of the ester.

3. A process which comprises contacting a dialkyl ester of a dicarboxylic acid selected from the group consisting of orthophthalic, adipic, azelaic and sebacic acids with an alkali earth metal silicate selected from the group consisting of barium and calcium silicates in the amount of from about 0.05% to about 1.5% by weight of said ester.

4. A process which comprises contacting a dialkyl adipate with an alkali earth metal silicate selected from the group consisting of barium and calcium silicates in the amount of from about 0.05% to about 1.5% by weight of said ester.

5. A process which comprises contacting a dialkyl azelate with an alkali earth metal silicate selected from the group consisting of barium and calcium silicates in the amount of from about 0.05% to about 1.5% by weight of said ester.

6. A process which comprises contacting a dialkyl orthophthalate with an alkali earth metal silicate selected from the group consisting of barium and calcium silicates in the amount of from about 0.05% to about 1.5% by weight of said ester.

7. A process which comprises contacting a dialkyl sebacate with an alkali earth metal silicate selected from the group consisting of barium and calcium silicates in the amount of from about 0.05% to about 1.5% by weight of said ester.

8. A process comprising contacting di(2-ethylhexyl) orthophthalate with calcium silicate in an amount of from about 0.05% to about 1.5% by weight of the said ester.

9. A process comprising contacting diisodecyl orthophthalate with calcium silicate in an amount of from about 0.05% to about 1.5% by weight of the said ester.

10. A process comprising contacting di(2-ethylhexyl) adipate with calcium silicate in an amount of from about 0.05% to about 1.5% by weight of the said ester.

11. A process comprising contacting di(2-ethylhexyl) azelate with calcium silicate in an amount of from about 0.05% to about 1.5% by weight of the said ester.

References Cited by the Examiner

UNITED STATES PATENTS 2,862,958    12/1958    Goreau _____ 260—475

LORRAINE A. WEINBERGER, *Primary Examiner.*

RICHARD K. JACKSON, *Examiner.*

T. L. GALLOWAY, *Assistant Examiner.*